(12) United States Patent
McCanney et al.

(10) Patent No.: US 11,036,994 B1
(45) Date of Patent: Jun. 15, 2021

(54) MULTI-MODAL OBJECT DETECTION SYSTEM WITH 5G ARRAY

(71) Applicant: Accenture Global Solutions Limited, Dublin (IE)

(72) Inventors: Peter Paul McCanney, Dún Laoghaire (IE); Benjamin Lipczynski, Ratoath (IE)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 13 days.

(21) Appl. No.: 16/700,232

(22) Filed: Dec. 2, 2019

(51) Int. Cl.
| | |
|---|---|
| *G06K 9/00* | (2006.01) |
| *G06K 9/62* | (2006.01) |
| *H01Q 21/06* | (2006.01) |
| *G01V 3/10* | (2006.01) |
| *G06T 15/00* | (2011.01) |

(52) U.S. Cl.
CPC ......... *G06K 9/00718* (2013.01); *G01V 3/105* (2013.01); *G06K 9/00771* (2013.01); *G06K 9/6268* (2013.01); *G06T 15/00* (2013.01); *H01Q 21/06* (2013.01); *G06K 2209/09* (2013.01)

(58) Field of Classification Search
CPC ................ G01S 7/417; G06K 9/00536; G06K 9/00718; G06K 9/00771; G06K 9/6268; G06K 2209/09; G06T 7/215; G06T 15/00; G01V 3/12; H01Q 21/06
See application file for complete search history.

(56) References Cited

U.S. PATENT DOCUMENTS

| | | |
|---|---|---|
| 6,791,487 B1 | 9/2004 | Singh et al. |
| 7,456,779 B2 | 11/2008 | Cross et al. |
| 10,229,328 B2 | 3/2019 | Nikolova et al. |

(Continued)

FOREIGN PATENT DOCUMENTS

| | | |
|---|---|---|
| CA | 2 895 795 A1 | 12/2015 |
| EP | 1 895 472 A2 | 3/2008 |

OTHER PUBLICATIONS

Hanif et al., "Non-obtrusive Detection of Concealed Metallic Olbjects Using Commodity Wifi Radios", IEEE Department of Electrical Engineering, Lahore University of Management Science, Lahore, Pakistan, Dec. 2018 (Year: 2018).*

(Continued)

*Primary Examiner* — Kenny A Cese
(74) *Attorney, Agent, or Firm* — Brinks Gilson & Lione

(57) ABSTRACT

A system may receive video data generated by a camera device positioned in a physical environment. The system may receive electromagnetic (EM) response signals generated by an array of 5G antenna devices. The system may refine the EM response signals. The system may determine location information for a metallic object. The system may generate a movement trajectory of the metallic object. The system may generate a feature vector comprising an aggregation of the refined EM response signals and the movement trajectory. The system may submit the feature vector to a machine learning framework. The system may classify the metallic object as a weapon. The system may generate a virtual render comprising a graphical indication of the metallic object. The system may combine the virtual render with the video input data and display the combined virtual render and video data.

23 Claims, 10 Drawing Sheets

(56) References Cited

U.S. PATENT DOCUMENTS

2020/0341114 A1* 10/2020 Acharya ............ G01S 13/26

OTHER PUBLICATIONS

Dr.-Ing Halid Hrasnica, "5G-enabled Context and situational Awareness detection with machine learninG techniques of city objects in Experimental vertical instances (5G-CAGE)," 5GinFIRE, Retrieved from the Internet on Nov. 11, 2019, pp. 1-4, published online by 5GinFIRE at URL https://5ginfire.eu/5g-cage/.

B. Dunnebier et al., "Concealed weapon detection," Defence, Security and Safety, Retrieved from the Internet on Nov. 13, 2019, pp. 1-2, published online by TNO Defence, Security and Safety at URL https://www.tno.nl/media/1397/veilig_orde_s050034_millimeter-radar-eng.pdf.

Eric Mason et al., "Deep learning for radar," IEEE Xplore, Digital Library, dated May 8, 2017, Abstract only, pp. 1-2, published in 2017 IEEE Radar Conference (RadarConf), Seattle, Washington.

Kartik Podugu et al., "How has machine learning been applied to radar signal processing?," dated May 30, 2017, pp. 1-2, published online by Quora at URL https://www.quora.com/How-has-machine-learning-been-applied-to-radar-signal-processing.

David Griffiths et al., "A Review on Deep Learning Techniques for 3D Sensed Data Classification," Remote Sensing, dated Jun. 25, 2019, pp. 1-29, vol. 11, No. 12, published online by MDPI at URL https://doi.org/10.3390/rs11121499, Basel, Switzerland.

"Unreal Engine Now Supports Maxon's Cinema 4D," Cinema 4D by Maxon, dated Jul. 22, 2019, pp. 1-4, published online by Epic Games at URL https://www.unrealengine.com/en-US/blog/unreal-engine-now-supports-maxon-s-cinema-4d.

"MVCNN_3DCNN Tutorial," Retrieved from the Internet on Dec. 2, 2019, pp. 1-69, published online by stanford.edu at URL http://3ddl.stanford.edu/CVPR17_Tutorial_MVCNN_3DCNN_v3.pdf.

"Spectrum Strategies," dated 2019, pp. 1-5, published online by Telefonaktiebolaget LM Ericsson at URL https://www.ericsson.com/en/networks/trending/hot-topics/5g-spectrum-strategies-to-maximize-all-bands.

Extended European Search Report issued on European application 20203555.6 dated Mar. 25, 2021, 9 pages.

\* cited by examiner

US 11,036,994 B1

MULTI-MODAL OBJECT DETECTION SYSTEM WITH 5G ARRAY

TECHNICAL FIELD

This disclosure relates to 5G technologies and, in particular, to object detection and rendering with 5G technologies and machine learning.

BACKGROUND

Weapon detection may involve analyzing electromagnetic energy reflected and/or refracted from metallic objects. Traditional approaches to weapon detection rely on metal detection hardware that is often localized to a small area, such as an entrance to a building, airport, or the like. Localized detection may result in bottlenecks or, even worse, failure to detect weapons that bypass the detection hardware. Furthermore, traditional approaches to weapon detection are prone to inaccuracies caused by human or machine errors. Such errors results may result in unnecessary physical searches of person or property.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
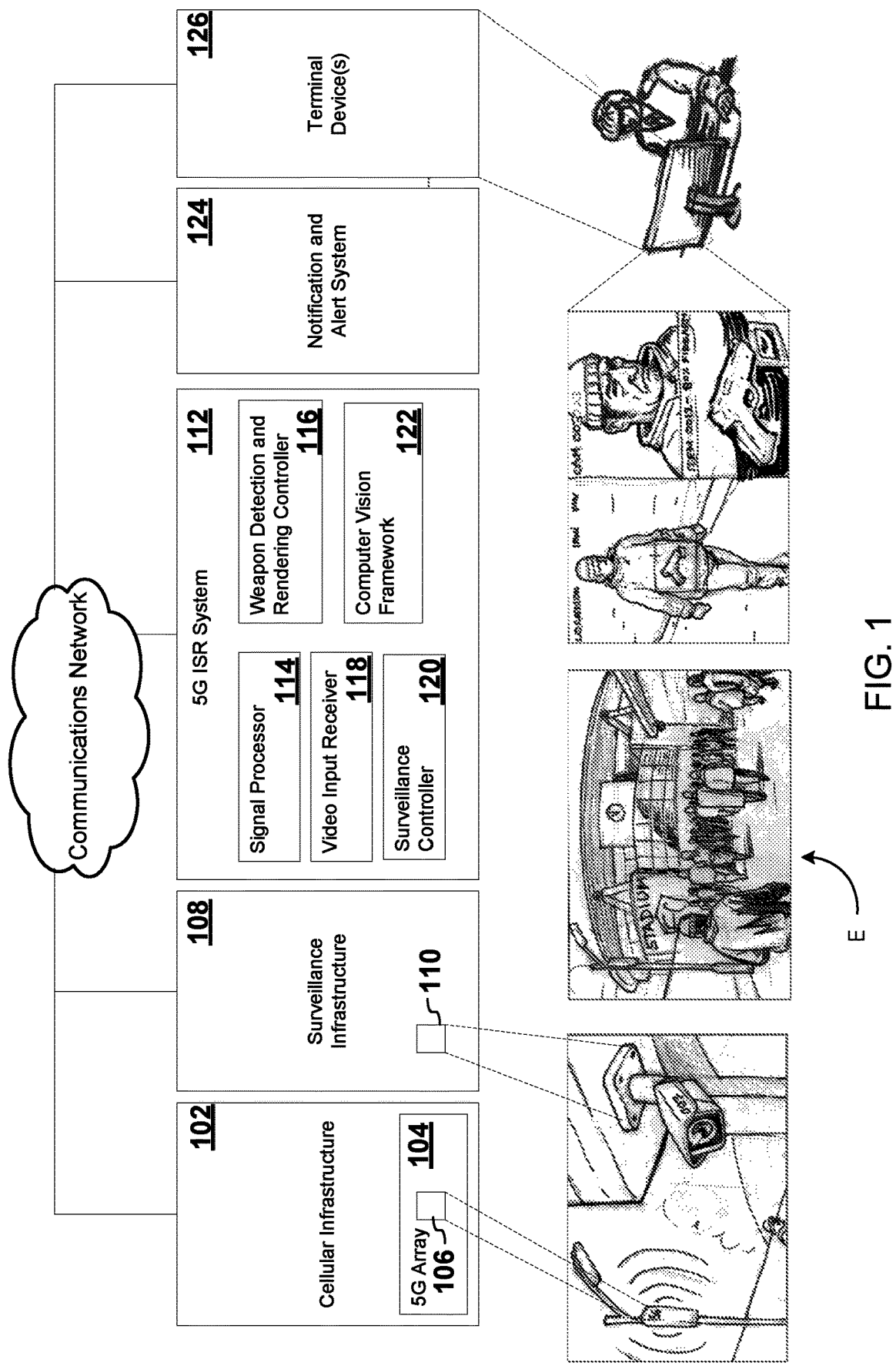
FIG. 1 illustrates a first example of a system.

Traditional approaches to weapon detection are localized to small areas, such as the entrances and exists to areas such airports, stadiums, etc. The radio frequencies used in such approaches fails to provide electromagnetic energy that penetrates material over larger distances and from multiple vantage points. In addition, traditional approaches often rely on human intervention to detect or classify objects as weapons, relying on inefficiencies and errors. Furthermore, traditional approaches fail to combine facts about a metallic object with other contextual information to accurately detect and classify weapons and measure weapon threat. These problems are acutely present with concealed weapons in large areas where human detection is not possible or impractical.

Accordingly, there is disclosed digital systems and methods for cellular based multi-modal weapon detection. By way of an introductory example, the system may include an array of 5G antenna devices positioned at multiple vantage points in a target physical environment. The system may further include a surveillance infrastructure comprising a camera device positioned in the target physical environment. The system may receive video input data generated by the camera device. The system may receive electromagnetic (EM) response signals generated by the array of 5G antenna devices. Each of the EM response signals may be generated by a separate corresponding 5G antenna device. The EM response signals may represent an EM response in the target physical environment. The system may refine the EM response signals based on removal of background noise from the EM response signals. The system may determine location information for the EM response signals. The location information represent a location of a metallic object in the target physical environment where EM energy was reflected or refracted. The system may generate a movement trajectory of the metallic object based on comparison of the location information with historical location information. The system may generate a feature vector comprising an aggregation of the refined EM response signals and the movement trajectory. The system may submit the feature vector to a machine learning framework configured to access a machine learning model previously trained based on training data, the training data comprising historical EM response signals and historical movement trajectories for metallic objects. The system may classify, in response to submission of the feature vector to the machine learning framework, the metallic object as a weapon. The system may generate, in response to the classification of the metallic object as a weapon, a virtual render comprising a graphical indication of the metallic object. The system may combine the virtual render with the video input data. The system may cause display of the combined virtual render and video data.

One example of a technical advancement achieved by the systems and methods described below may be as attendees enter the physical environment, they are safely and anonymously scanned by the pervasive 5G signals provided by a 5G cellular infrastructure. Multiple 5G antenna devices that operate in the upper 5G bands (i.e. 24 GHz-86 GHz) may be distributed throughout the physical environment. A metal object, such as a weapon, moving through the physical environment may generate EM energy response. The 5G antenna devices may measure the EM response from multiple vantages and generate corresponding EM response signals.

Another example of a technical advancement achieved by the system and methods described herein is improved predictive performance for identifying and classifying weapons in real-time. The EM response signals from separate antenna devices may be aggregated into a feature vector for a machine learning framework. The feature vector may further include additional symbolic features and/or sub symbolic features derived from the EM descriptive of the metallic object, including movement information, physical attributes, or other symbolic features and/or sub-symbolic features. To improve processing performance and real-time detection, a signal processor may filter background noise and/or group EM response signals likely to be classified as a weapon before the feature vector is generated.

Another technical advancement achieved by the systems and method described herein is that computer-generated insights derived from these 5G signals and other sources of data may provide a virtual render of the target environment, and/or weapons contained therein. The virtual render may be displayed with video data to create an augmented reality experience where the environment is filtered to find objects that match a watch list such as firearms, knives, etc. Operators may be alerted to focus on high interest subjects in real-time. Additional information relating to a subject to allow operators to make informed decisions regarding next actions.

Additional or alternative benefits, efficiencies, and improvements over existing solutions are made evident in the systems and methods described below.

FIG. 1 illustrates a first example of a system 100. The system may include a cellular infrastructure 102. The cellular infrastructure 102 may include a 5G array 104. The 5G array 104 may include 5G antenna devices 106 positioned throughout a physical environment E. The 5G antenna device 106 may include, for example, a 5G millimeter wave antenna. Alternatively or in addition, the 5G antenna deice 106 may include a radio access node, or an antenna for a radio access node. For example, the 5G antenna device may include a small cell or a radio for a small cell.

The 5G antenna device 106 may emit electromagnetic energy that reflects and refracts off of objects in the physical environment E. The 5G antenna device 106 may receive an EM emission signal (or signals) that cause the 5G antenna device 106 to emit the electromagnetic energy in 5G frequency bands. The EM emission signal may cause the 5G antenna device(s) 106 corresponding electromagnetic energy. The 5G emission signal may include various parameters, such as a frequency band or other information used by the 5G antenna devices 106 to generate the EM emission.

The 5G antenna device(s) 106 may detect an EM response in the physical environment E. The EM response may include EM energy reflected/refracted from objects in the physical environment E. The 5G antenna device 106 may generate an EM response signal in response to detection of the reflected/refracted EM. The EM response signal may include a measurement of one or more attribute of an electromagnetic energy reflected/reflected in the physical environment E.

The system 100 may further include a surveillance infrastructure 108. The surveillance infrastructure 108 may generate video data of a physical environment E. The surveillance infrastructure may include one or more camera device 110. The camera device 110 may include a device that captures an image and/or video information. The camera device 110 may receive instructions to adjust zooming, angle, resolution, and/or invoke other operations that effect the direction of the camera and/or the quality of video data captured by the camera. The surveillance infrastructure 108 may include multiple camera devices distributed throughout the physical environment E.

The physical environment E may include environment that is monitored for weapons and/or other prohibited items. For example, the physical environment E may include an area, such as a geographic area or space. Alternately or in addition, the physical environment E, or a portion thereof, may be defined by structures such as walls, buildings, fences, etc. In other examples, the physical environment E may include the coverage area of the cellular infrastructure 102 (or a portion thereof). For example, the physical environment E may include the geographic area in which the 5G array 104 is capable of sending EM signals and receiving EM energy. In other examples, the physical environment E may be defined based on pre-determined boundaries specified by coordinates or other boundary criteria.

The system 100 may further include an 5G information, surveillance, and ISR system 112 (hereinafter ISR system). The ISR system 112 may include a signal processor 114, a weapon detection and rendering (WDR) controller 116, a video input receiver 118, a surveillance controller 120, and/or a computer vision framework 122.

The signal processor 114 may communicate with the cellular infrastructure 102 to cause electromagnetic energy to be emitted and subsequently received from the physical environment E via one or more 5G antenna device 106. For example, the signal processor 114 may send EM emission signals to one or more 5G antenna device 106 and then subsequently receive EM response signals from the 5G antenna device 106. The signal processor 114 may further refine the EM response signals. Additional details regarding the signal processor 114 are described in FIGS. 2-3 and the related discussion.

The WDR controller 116 may generate a three-dimensional render of the environment, including model data for one or more weapons detected therein. For example, the WDR controller 116 may receive EM response signals corresponding to metal objects in the physical environment E. The WDR controller 116 generate signal-based features (e.g. features derived from EM response signals). In addition, the WDR controller 116 may receive image-based features (features derived from image information). The WDR controller 116 may apply various machine learning to infer whether or not the metallic object is a weapon. The WDR controller 116 may further generate a tenderable model for the weapon and/or the physical environment E. Additional details regarding the WDR controller 116 are in FIGS. 4-5 and the related discussion.

The video input receiver 118 may receive video data generated by the surveillance infrastructure 108. The video data may include streaming video, images, or a combination thereof. Alternately or in addition, the video data my include location information corresponding to the location of a camera capturing the video, the angle of the camera, the zoom factor of the camera, etc.

The surveillance controller may control one or more camera devices in the surveillance infrastructure 108. For example, the surveillance controller may generate instructions to the one or more cameras to control functionality of the camera (zoom, angle, resolution, etc).

The computer vision framework 122 may generate image-based features that are derived from the video data. The image based features may include symbolic and/or sub symbolic features generated from the video input data. For example, the symbolic features may be determined based on image recognition technology that classifies images into symbolic categories (i.e. person, floor, door, etc). The sub-symbolic features may include raw pixel data, such as RGB values, detected edges, etc.

In some examples the computer vision framework 122 may generate a virtual render of the physical environment E, or a portion thereof. The virtual render may include a real-time virtual representation of the physical environment E, or portions thereof. For example, the virtual render may include a scene graph or some other data structure for computer graphics. Alternatively or in addition, the virtual render may include video data, model data corresponding to symbolic features detected in the physical environment E. The virtual render may be further enriched by the WDR controller 116. For example, the WDR controller 116 may append tenderable models corresponding to the signal based features detected in the physical environment E. In other examples, the WDR controller 116 may generate the virtual render and append models for the image-based features detected by the computer vision framework 122.

The system may further include a notification and alert system 124. The notification and alert system 124 may generate notifications for one or more users in response to detection of a weapon in the physical environment E. In some examples, the notification may include an interactive object, such as a link, that causes a terminal device to load the virtual rendering generated by the WDR controller 116.

The notification and alert system 124 may include trigger criteria. The trigger criteria may include conditions for when a notification should be generated. In various examples, the criteria may compare a threat index for a detected weapon to a predetermined threshold. Alternatively or in addition, the criteria may compare a weapon classification to predetermined categories. In response to satisfaction of the criteria, the notification and alert system 124 may send a notification to registered users. Additional discussion regarding the threat index and weapon classification are described in FIGS. 8-9 and the related discussion.

The system may include one or more terminals 126. The terminals may display the virtual render and/or the notifications. The terminals may include a monitor, a mobile device, a computer, and/or any other device with a screen that displays information and/or receives input commands.

Figure 2:
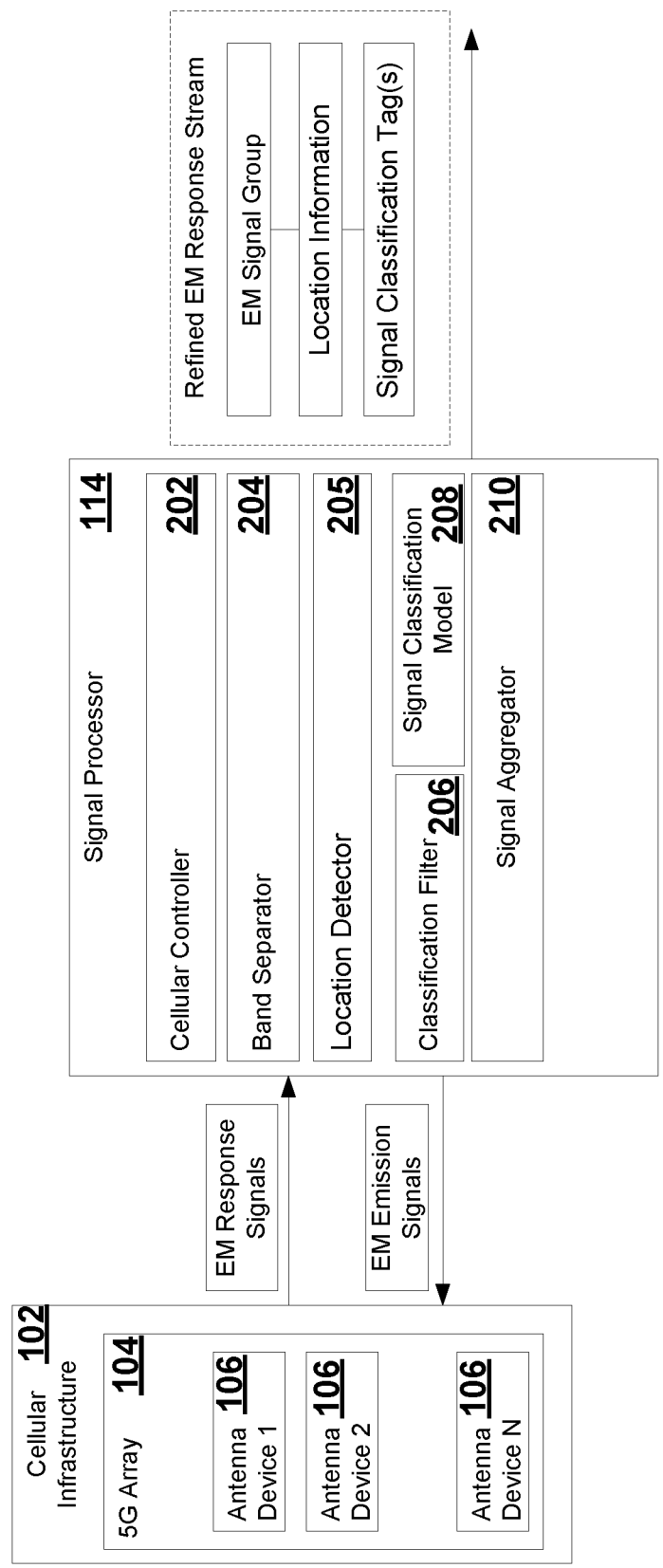
FIG. 2 illustrates an example of a signal processor.
Figure 3:
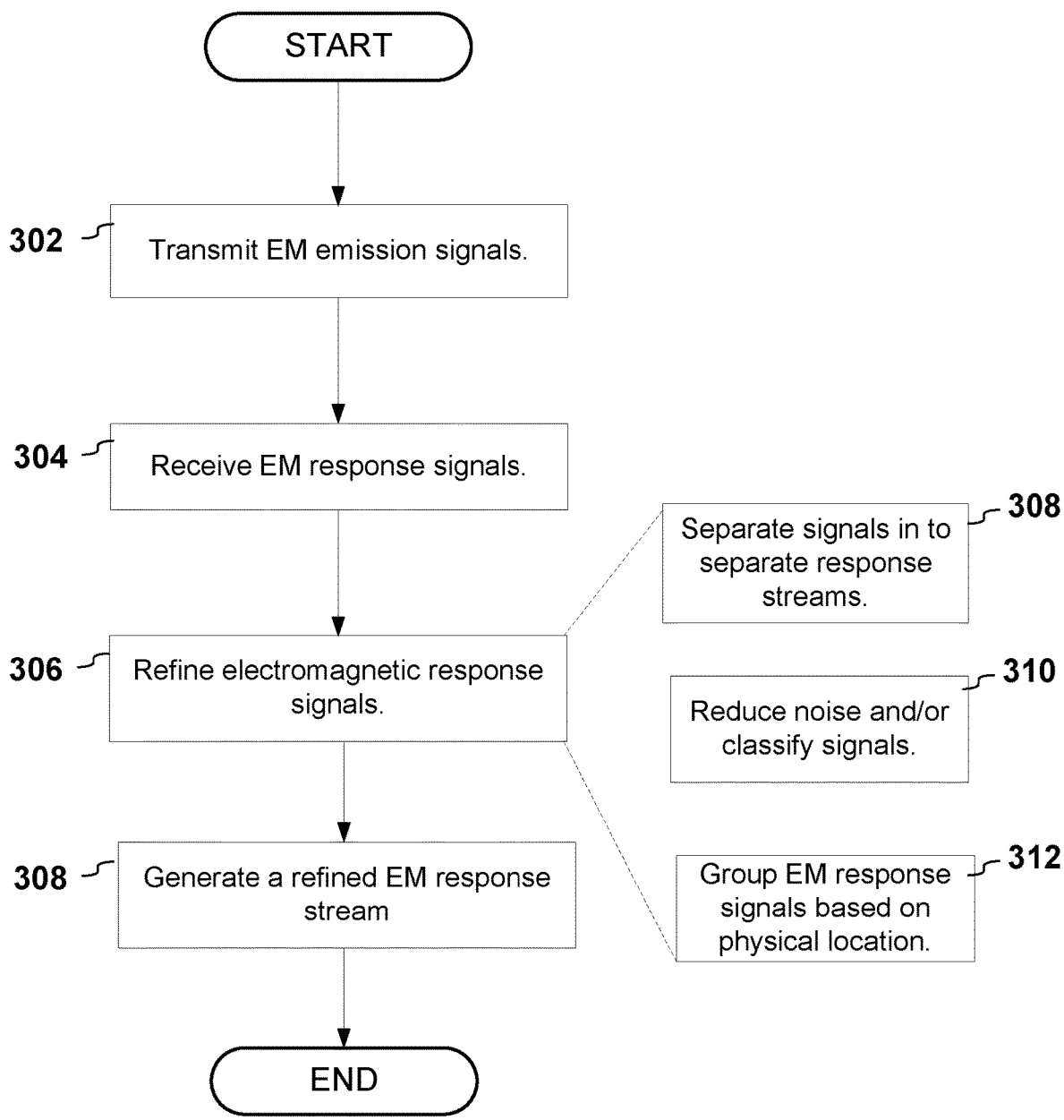
FIG. 3 illustrates a flow diagram of example logic of a signal processor.

FIG. 2 illustrates an example of the signal processor 114. The signal processor 114 may include a cellular controller 202, a band separator 204, a location detector 205, a classification filter 206, a signal classification model 208, and/or a signal aggregator 210. FIG. 3 illustrates a flow diagram for example logic of the signal processor 114. Reference to FIG. 2 is made throughout the following discussion of FIG. 3

The cellular controller 202 may transmit and EM emission signals (302). The cellular controller 202 may transmit the EM emission signals to one or more 5G antenna device 106 (FIGS. 1-2.) Alternatively, the cellular controller 202 may transmit the EM signals to a service provider in communication with the 5G antenna devices 106. The service provider may cause the 5G antenna device(s) 106 to emit EM energy based on the EM emission signals.

The signal processor 114 may receive EM response signals (304). The EM response signals may be generated by one or more antenna device 106 in response to detection of reflected/refracted EM energy in the physical environment (FIG. 1). In some examples, the 5G antenna device 106 may communicate the EM response signals to the signal processor 114. Alternatively, the 5G antenna device 106 may communicate the EM response signals to a service provider, which makes the EM response signals available to the signal processor 114.

The signal processor 114 may refine the EM response signals (306). To refine the EM response signals, the band separator 204 may separate the EM response signals into separate streams (308). For example, the signal processor 114 may separate EM response signals into streams corresponding to different frequency bands. In some examples, the band separator 204 may cause some 5G bands to be filtered. For weapon detection, upper bands may be more useful than other bands because of the upper bands are most likely to generate EM reflection/reflections that are detectable for small weapons. The upper bands may include higher frequency band used by 5G such as, but not limited to, 24 Ghz-40 Ghz. In some examples, I-Band frequencies may produce optimal penetration, refraction and reflection properties allow for metal object detection when concealed by clothing.

The location detector 205 may determine location information for EM response signal(s). The location information may identify the location in which electromagnetic energy was reflected and/or refracted in the physical environment. The location detector may analyze the received EM response signal patterns based on the wavelength, frequency, amplitude, and other information to determine the source of the reflected/refracted EM energy in the physical environment. For example, the location information may include two or three dimensional coordinates, such as latitude longitude, altitude. Alternately or in addition, the location information may include coordinates that identify position within a three dimensional Cartesian coordinates.

The classification filter 206 may reduce noise and/or classify the EM response signals (310). For example, the classification filter 206 may classify the EM response signals into various categories, such as weapons-based EM signals and background-based EM signals. The noise filter may access a signal classification model 208. The signal classification model 208 may include a machine learning model. Various types of machine learning may be applicable to classify the EM response signals including, for example, Convolutional Neural Networks (CNNs) and/or Fully Convolutional Networks (FCNs).

In some examples, the signal classification model 208 may be trained based on historical EM signals. Initially, the classification model may be trained based on EM response data generated in an RF Anechoic chamber. The classification model may be further trained depending on the type of physical environment and arrangement of cellular infrastructure 102. For example, a first classification model for a ball park environment may have different trained weights and biases compared to a classification model in a mall, or some other environment. Thus, the initial classification model may be further trained based on EM response data generated in various types of physical environments.

Alternatively or in addition, the signal classification model 208 may by trained to identify static objects within a physical environment. For example, as EM response signals are obtained for the physical environment, static objects may be detected. The classification filter 206 may dynamically train the signal classification model 208 to increase the confidence that such signals can be classified as background noise. Accordingly when a new or moving metallic object enters the physical environment, the background model may produce lower confidences that the metallic object is background noise.

The signal aggregator may group the EM response signals into one or more signal groups. A signal group may include two or more EM response signals generated by separate corresponding antenna devices. The EM response signals in a signal group may each correspond to EM energy reflected and/or refracted from the same object in the physical environment. To group the signals, signal aggregator may access a signal grouping model. The signal grouping model may include a machine learning model, a statistical model, a rule-based model, or some other suitable model that applies a grouping criteria to determine whether to group EM response signals together. By way of example, the grouping criteria may group signals that are generated by EM energy reflected and/or refracted at the same, or approximately the same location in the physical environment.

Alternatively or in addition, the signal aggregator may determine location information for a group of EM signals. For example, the signal aggregator may combine the location information for each of the EM signals in a group of EM signals. Thus, the location information for the group of EM signals may include an average value correspond to a point, area, and or three-dimensional space in the physical environment.

The EM signal aggregator may generate a refined EM response stream. The refined EM response stream may include EM signal groups. Each of the EM response signal groups may include EM response signals corresponding to the same object that reflected/refracted EM energy in the physical space. The EM signals groups may be mapped with location information and/or a classification tag. The classification tag may classify the EM signal group as a weapon or some other object (i.e. static background noise).

A technical advancement provided be the refined signals provided by the signal processor 114 is that EM response signals may be filtered with machine learning techniques and grouped into EM signals groups that are caused by metallic objects in the target physical environment that are likely to be weapons. However, the EM signal groups may undergo further machine-learning analysis to increase detection and classification accuracy.

Figure 4:
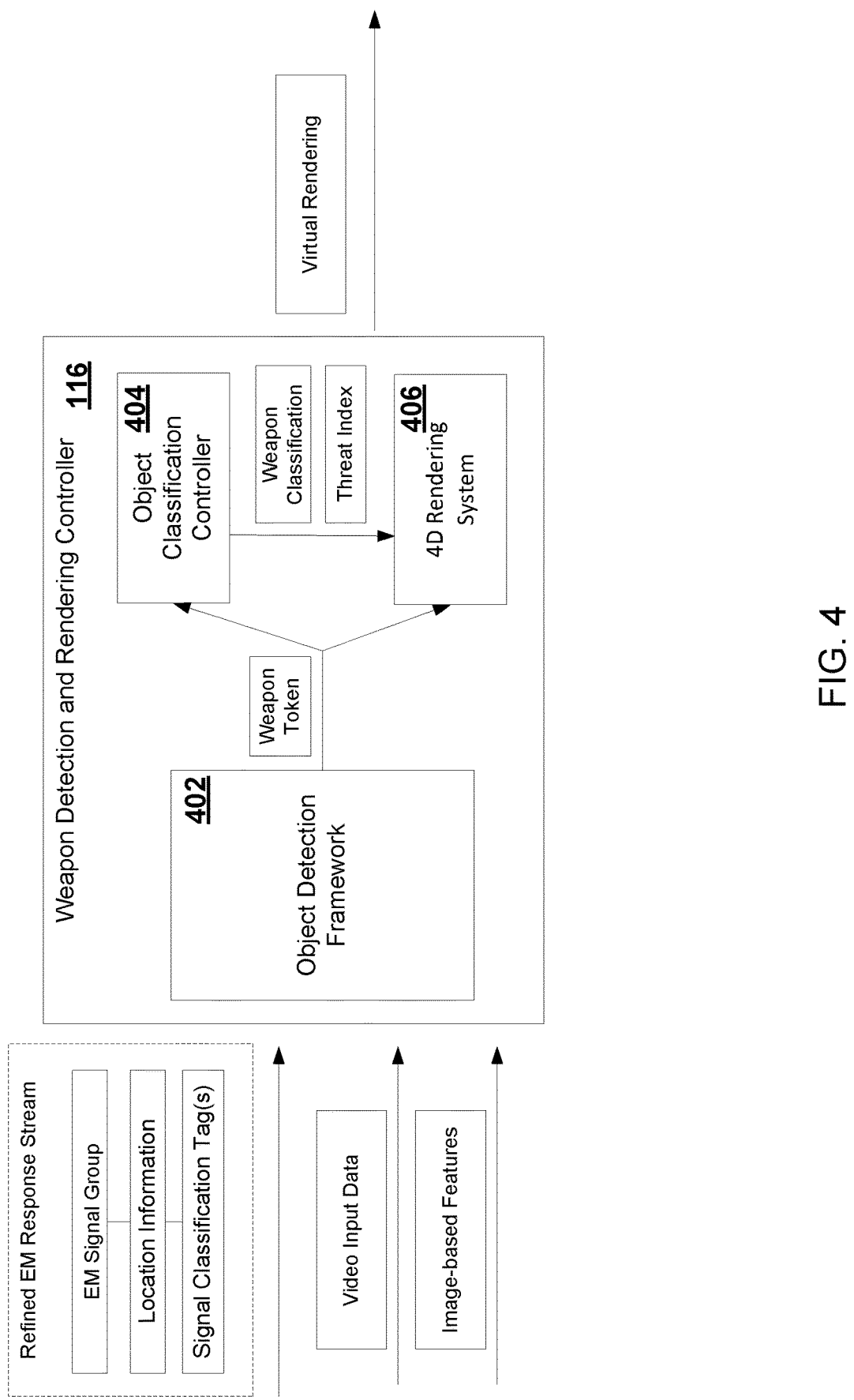
FIG. 4 illustrates an example of a weapon detection and rendering (WDR) controller.
Figure 5:
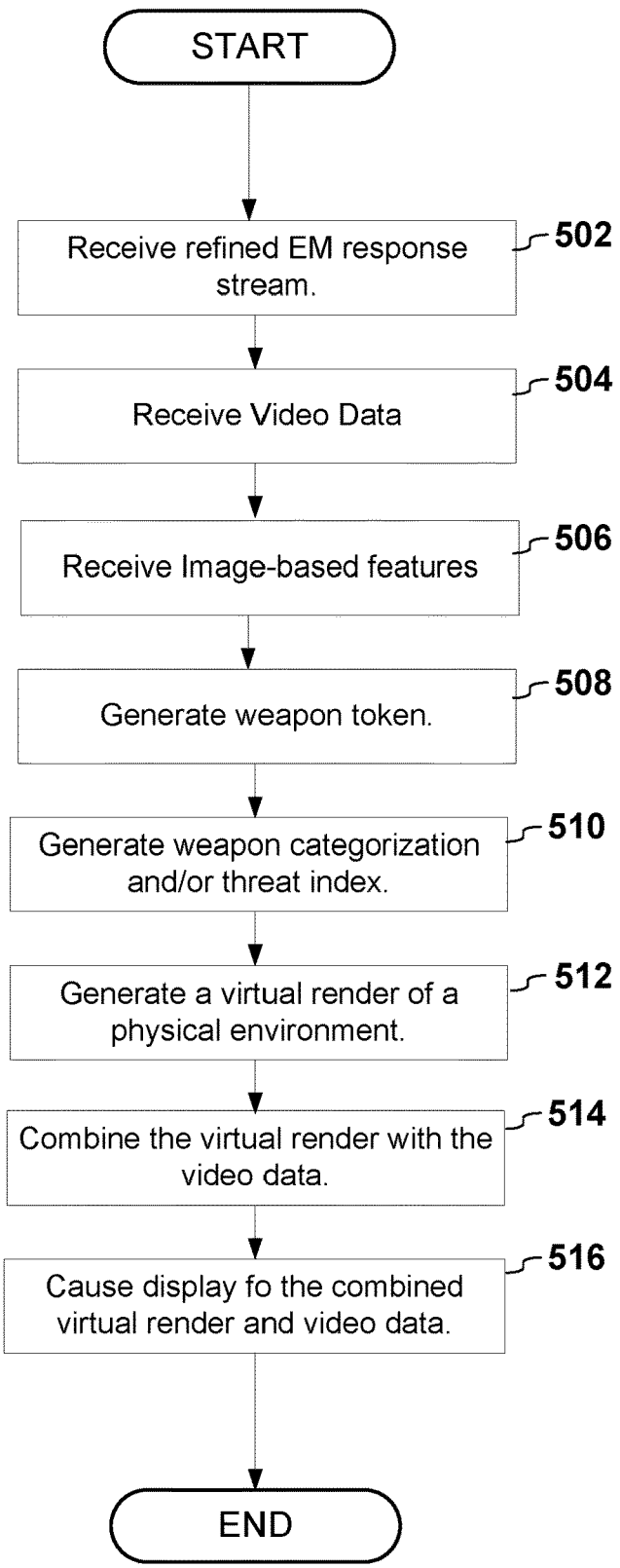
FIG. 5 illustrates a flow diagram of example logic for the WDR controller.

FIG. 4 illustrates an example of the WDR controller 116. The WDR controller may include an object detection framework 402, an object classification controller 404, and a 4D rendering system 406. FIG. 5 illustrates a flow diagram of example logic for the WDR controller 116. Reference to FIG. 1-4 is made throughout the following discussion of FIG. 5.

The WDR controller may receive refined EM response stream(s) (502). The WDR controller may receive video input data (504). The WDR controller may receive image-based features (506). The object detection framework 402 may generate a weapon token (508). The weapon token may include token information corresponding to a metallic object in the physical environment. For example, the weapon token may include various attributes, including, size, shape, density, location, etc. Alternatively or in addition, the weapon token may include any of the image-based feature and/or signal based features described in reference to Table 2 below. As facts related to the weapon are determined, the weapon token may be refined by including or associating additional attributes with the weapon token. In some examples, the data structure for the weapon token may include a knowledge graph where various attributes are represented as nodes. The nodes may be interconnected by edges that are descriptive of relationships between the nodes. Additional description of the object detection framework and generation of the weapon token are described in FIGS. 6-7 and the related discussion.

The object classification controller 404 may generate a weapon classification and/or a threat index for the weapon token (510). A weapon classification may include a categorical classification of a weapon. For example, the weapon type may include (gun, knife, rifle, etc). A threat index may include a measurement of a threat of the weapon. The measurement may correspond to a quantitative scale (i.e. 1 to 10) and/or qualitative scale (high, medium, low). In some examples, the threat index may be linked with a weapon type. For example, the weapon classification repository may store a link between a threat index and a weapon type. Additional description of the object classification controller 404 is further described in FIGS. 8-9 and the related discussion.

The 4D Rendering System 406 may generate a virtual render of the physical environment, or a portion thereof (512). The virtual render may include a real-time virtual representation of the physical environment, or portions thereof. For example, the virtual render may include a scene graph or some other data structure for computer graphics. Alternatively or in addition, the virtual render may include video data, a graphic representative of a detected weapon, a graphic indicative of the thread index, or a combination thereof. For example, each of the EM response signals may represent a reflection/refraction at a corresponding location in the physical environment. The 4D rendering system 406 may generate a three-dimensional render of the weapon based on the locations of reflection/refraction. For example, the 4D rendering engine may generate tenderable model, such as a plurality of vertices that respectively correspond to the reflection/refraction locations.

The 4D rendering system 406 may combine the virtual model with the video information (514) to generate an augmented visual of the physical environment, or a portion thereof. Alternatively or in addition, the 4D rendering system 406 may receive a render of the physical environment from the computer vision system. The 4D rendering system 406 may further enrich the render with the renderable model of the weapon. For example, the computer vision system may pre-generate a scene graph with various nodes representative of image-based features to be rendered. The 4D rendering system 406 may receive the scene graph and append an additional node to the scene graph representative of signal-based feature for a weapon in physical environment.

The 4D rendering system 406 may cause display of the combined virtual render and video data (516). For example, the 4D rendering system 406 may generate an interactive user interface that display the video input data with the virtual render overlayed on top of the video data. The user interface may include various graphics that the renderable model of the weapon, the threat index, the weapon classification, or a combination thereof, and/or any other image-based or signal-based features related to the weapon.

Figure 6:
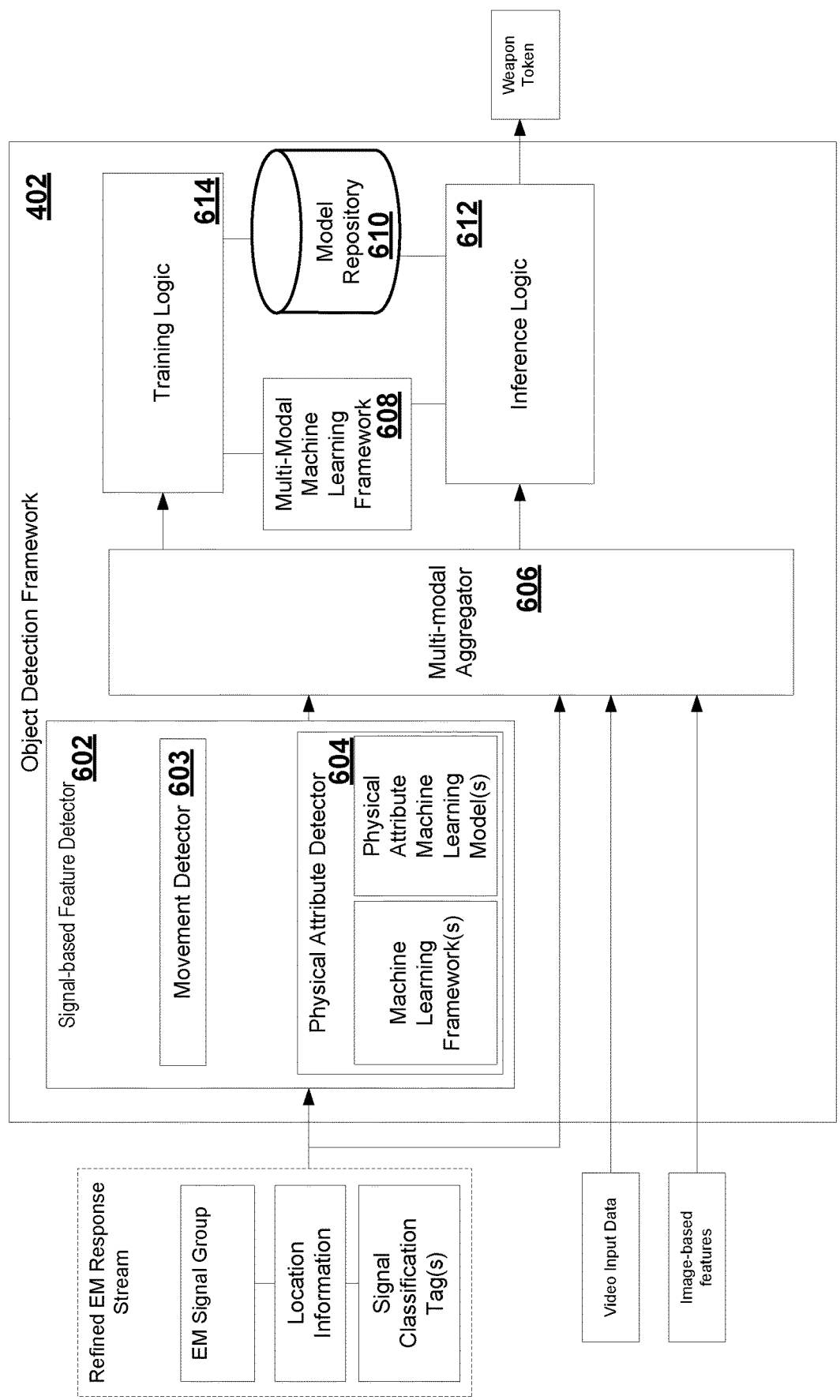
FIG. 6 illustrates an example of an object detection framework.

FIG. 6 illustrates an example of the object detection framework 402. The object detection framework 402 may include a signal-based feature detector 602, a multi-modal aggregator 606, a multi-modal machine learning framework 608, a model repository 610, inference logic 612 and/or training logic 614.

Figure 7:
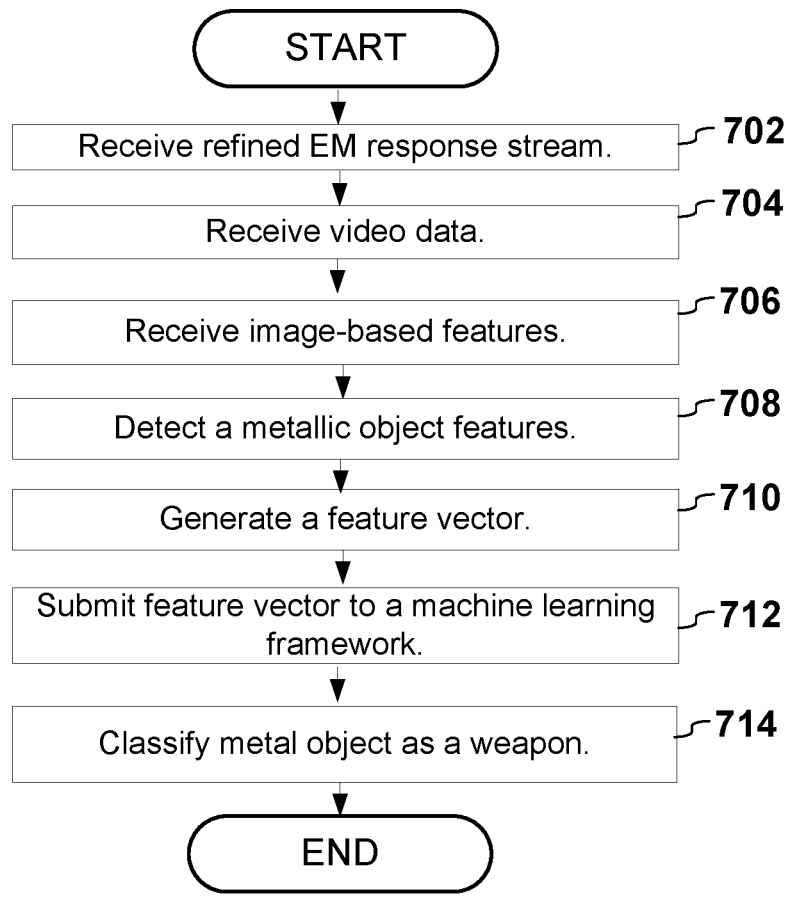
FIG. 7 illustrates a flow diagram of example logic for an object detection framework.

FIG. 7 illustrates a flow diagram of example logic for the object detection framework 402. The signal-based feature detector 602 may receive a refined Em response stream (702). The multi-modal aggregator 606 may receive video input data (704). The video input data may include streaming video data and/or one or money or more images. The video input data may include video/image data captured by a camera positioned in a physical environment. Thus, the video input day may represent a visual of the physical environment, or a portion thereof.

The multi-modal aggregated may receive image-based features (706). As previously discussed, the image based features may include symbolic or sub-symbolic representations of the physical environment or objects included therein. The computer vision framework 122 (FIG. 1) may generate the image-based features.

The signal-based feature detector 602 may detect signal-based features (708). A signal-based object feature may include information that describes the presence of a metallic object in a target physical environment, the location of the metallic object, movement of the metallic object, and/or physical attributes of the metallic object.

For example, signal based feature detection may include a physical attribute detector 604. The physical attribute detector 604 may identify one or more physical attributes of the metal object. Table 1 lists examples of various metallic object features. As illustrated in Table 1, physical attributes may have various types. In some examples, the physical attribute detector 604 may access one or more machine learning models to detect the physical attributes. For example, the physical attribute detector 604 may access a separately trained machine learning model for each metallic object feature type. Thus, for example, the metallic object detector may access a first model to determine metallic object size, a second machine learning model to determine metallic object shape, a third machine learning model to determine metallic object density, and so on. Each of the metallic object machine learning models may be trained to identify/infer corresponding metallic object features based on EM response signals.

TABLE 1

Physical attributes.

| Size | Model A |
|---|---|
| Density | Model B |
| Material | Model C |
| ... | ... |

The movement detector 603 may determine a movement trajectory for a metallic object. The movement trajectory may identify a movement path through the physical environment. For example, the movement information may include a series of location measurements. Alternately or in addition, the movement trajectory may include a plurality of movement vector. In other examples, the movement information may include a movement path over a time period. For example, the movement path may include multiple positions of the metallic object in the physical environment. In some examples, the movement path may be defined over a time window (1 sec, 5, sec, 1 min, etc.).

The multi-modal aggregator 606 may generate a feature vector (710). For example, the multi-modal aggregator 606 may aggregate various types of features into a combined, multidimensional feature vector. The feature vector may include signal based feature(s) and/or image-based features. The signal based features may include symbolic and/or sub-symbolic features derived from the EM response signals. The image-based features may include symbolic or sub-symbolic features derived from the video data.

In some examples, the feature vector may include multiple EM response signals generated by separate respective 5G antenna devices. The multiple EM response signals may correspond to measurements of EM data at different locations and angles in the physical environment. For example, a first 5G antenna device may generate a first EM response signal. A second 5G antenna device may generate a second EM response signal. The first and second 5G response signals may include signal-based measurements of a metallic object from different angles and positions in the physical space. The multiple EM response signals may be aggregated together with other symbolic information, such as movement information.

Alternately or in addition, the feature vector may include an aggregation of one or more of the features identified in reference to Table 2

TABLE 2

Feature Vector Example

| | Feature Types | | Feature Vector |
|---|---|---|---|
| Signal Based Features | Sub symbolic Features | EM Response Signals | EM Response Signal from Antenna Device 1 |

TABLE 2-continued

Feature Vector Example

| | Feature Types | | Feature Vector |
|---|---|---|---|
| | | | EM Response Signal from Antenna Device 2 |
| | | | ... |
| | Symbolic Features | Physical Attributes | Size Density Material |
| | | Location Information | Latitude (or X position) Longitude (or Y position) Altitude (or Z position) |
| | | Movement Information | Latest Speed Latest Direction Latest Position Historic Speed (t-N secs) Historic Direction(t-N secs) Historic Position(t-N secs) |
| Image-Based Features | Symbolic Image Features | Proximal | Human body recognition (i.e. hand, leg, etc.). Facial recognition information. Neighboring Structures/objects |
| | Sub-symbolic image features | Pixel Information | RGB data |

The example feature included in the feature vector column in Table 2 is provided as an example. Depending on the implementation, the multi-modal aggregator 606 may aggregate more, less, or different features than those illustrated in Table 2. Moreover, the signal based features and/or image based features may include additional or alternative features. It should also be appreciated that in examples, where the metallic object is visible or partially visible the image-based features may also generate symbolic location information, movement information, and or physical attributes derived from image data based on image recognition analysis.

In some examples, the multi-modal aggregator 606 may generate parameters prior to aggregation. The parameters may include signal-based features and/or image-based features. The multi-modal aggregator 606 may combine in the features in to a multi-dimensional vector for the machine learning model.

The training logic 614 and/or the inference logic 612 may submit the generated feature vector to a multi-modal machine learning framework (712). The multi-modal machine learning framework may access a machine learning model previously trained based on historical features. Based on the weights and biases of the machine learning model, the training logic 614 may generate an inference measurement of the metal object being a weapon. The inference measurement may include, for example, a confidence measurement in a range (i.e. 0 to 100) or a discrete value (i.e. weapon/not weapon).

The inference logic 612 may classify the metallic object as a weapon (714). For example, the inference measurement from the machine learning framework may represent a confidence of the metallic object being a weapon. The inference logic 612 may determine the confidence measurement is greater than a threshold confidence value. In some examples, the threshold confidence value may be tunable such that an operator may increase or decrease the threshold confidence value to adjust system performance.

The machine learning model may be stored in the model repository 610. The model repository 610 store multiple machine learning models. In some examples, the model repository 610 may associate the machine learning models with respective physical environment identifiers. For example, the machine leaning framework may be respectively trained based generated within a corresponding physical environment, or a corresponding type of physical environment. Thus, deployment of the object detection framework 402 for a target physical environment may be achieved by loading selecting the machine learning model from the model repository 610 that is mapped to the identifier of the target physical environment (or the type of target physical environment).

The training logic 614 may train the machine learning model(s). For example, the refined EM response signals, video input data, and/or image-based features may be receive when a weapon is present in the physical environment. The training logic 614 may adjust the weights and biases of the machine learning model to accurately predict the presence of the weapon. The train model may be stored in the model repository 610 and later accessed during inference time.

Figure 8:
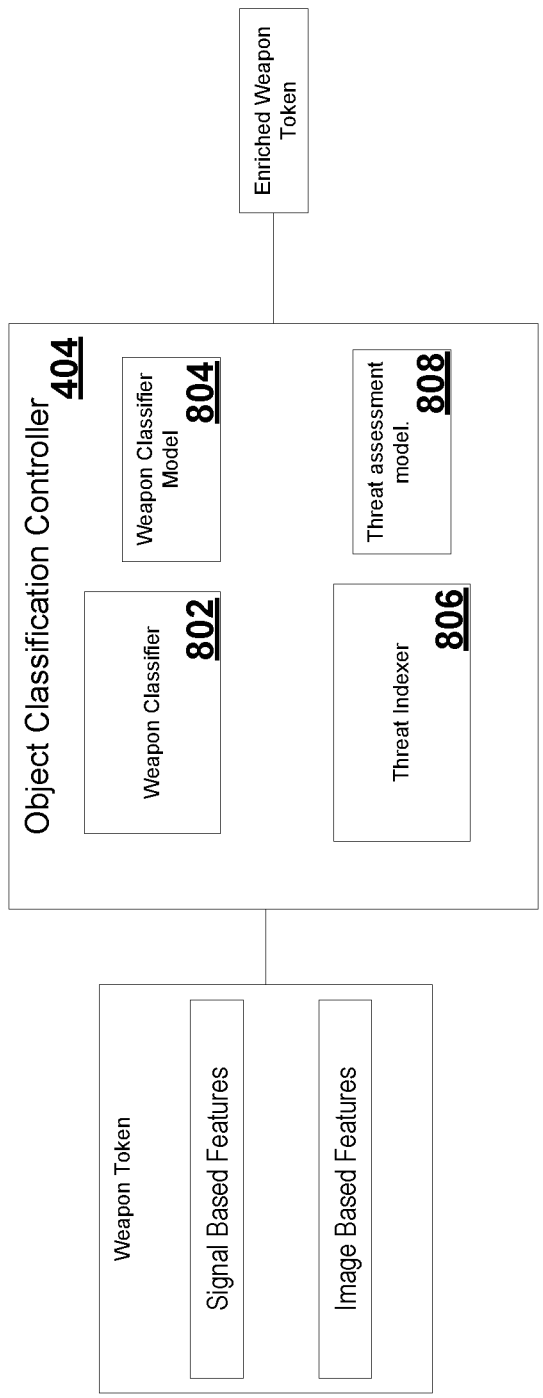
FIG. 8 illustrates an example of an object classification controller.
Figure 9:
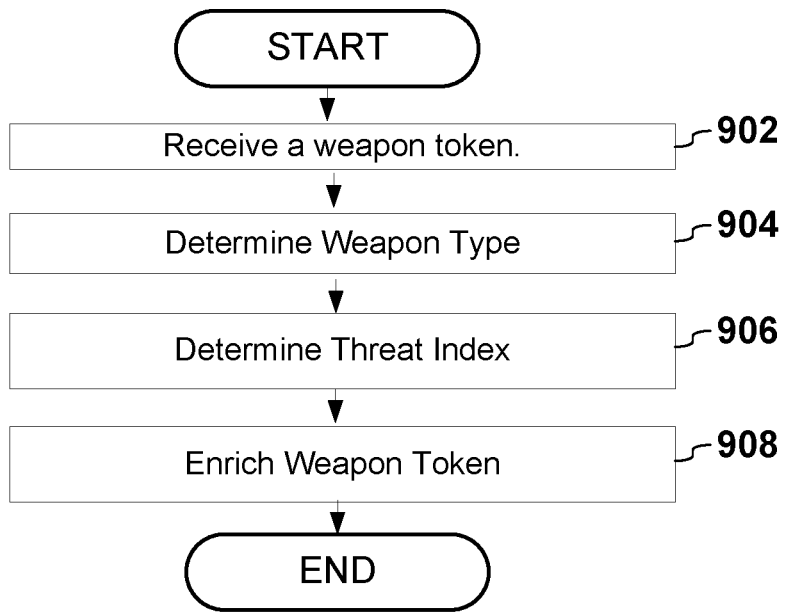
FIG. 9 illustrates a flow diagram of example logic for an object classification controller.

FIG. 8 illustrates an example of an object classification controller 404. FIG. 9 illustrates a flow diagram of example logic for the object classification controller 404. Reference to FIG. 8 is made throughout the following discussion of FIG. 9.

The object classification controller 404 may receive a weapon token (902). As previously discussed, the weapon token may include parameters descriptive of a weapon, such as signal based features and/or image based features.

The weapon classifier 802 may determine a weapon type (904). For example, the weapon classifier 802 may apply supervised and/or unsupervised learning to classify the weapon token as a particular weapon type. In some examples, the weapon classifier 802 may access a weapon classifier model 804. The weapon classifier model 804 may include a statistical based or rule-based machine learning model that classifies the weapon as a particular type of weapon based on the signal and/or image based features of the weapon token. In some examples, the weapon classifier model 804 may have one or more rules to categorize the weapon token based on density, size, material, or other features. The rules may include criteria, such as a threshold value, operators, etc, that compare the parameter(s) of the weapon token with the threshold values.

The threat indexer 806 may determine a threat index (906). For example, the threat indexer 806 may access a threat assessment model 808. The threat assessment model 808 may include a rule-based model, such as a rule-based machine learning model, comprising rules to determine a threat index based on facts about a weapon. The facts may include, for example, information included in the weapon token and/or the weapon classification.

The object classification controller 404 may enrich the weapon token (908. For example, the object classification controller 404 may associate the threat index and/or the weapon classification with the weapon token. Depending on the data structure for the weapon token, the object classification controller 404 may include the threat index and/or weapon classification with the weapon token. Alternately or in addition, the object classification controller 404 may link the threat index and/or weapon classification to the weapon token. By way of example, the weapon token may include (or be included in) a knowledge graph where a first node represents a weapon and additional nodes representative of the threat index and weapon classification are linked to the weapon node via respective edges.

The logic illustrated in the flow diagrams of FIGS. 3, 5, 7, and 9 may include additional, different, or fewer operations than illustrated. The operations illustrated may be performed in an order different than illustrated.

The system 100, or subcomponents therein, may be implemented with additional, different, or fewer components than illustrated. Each component may include additional, different, or fewer components.

Figure 10:
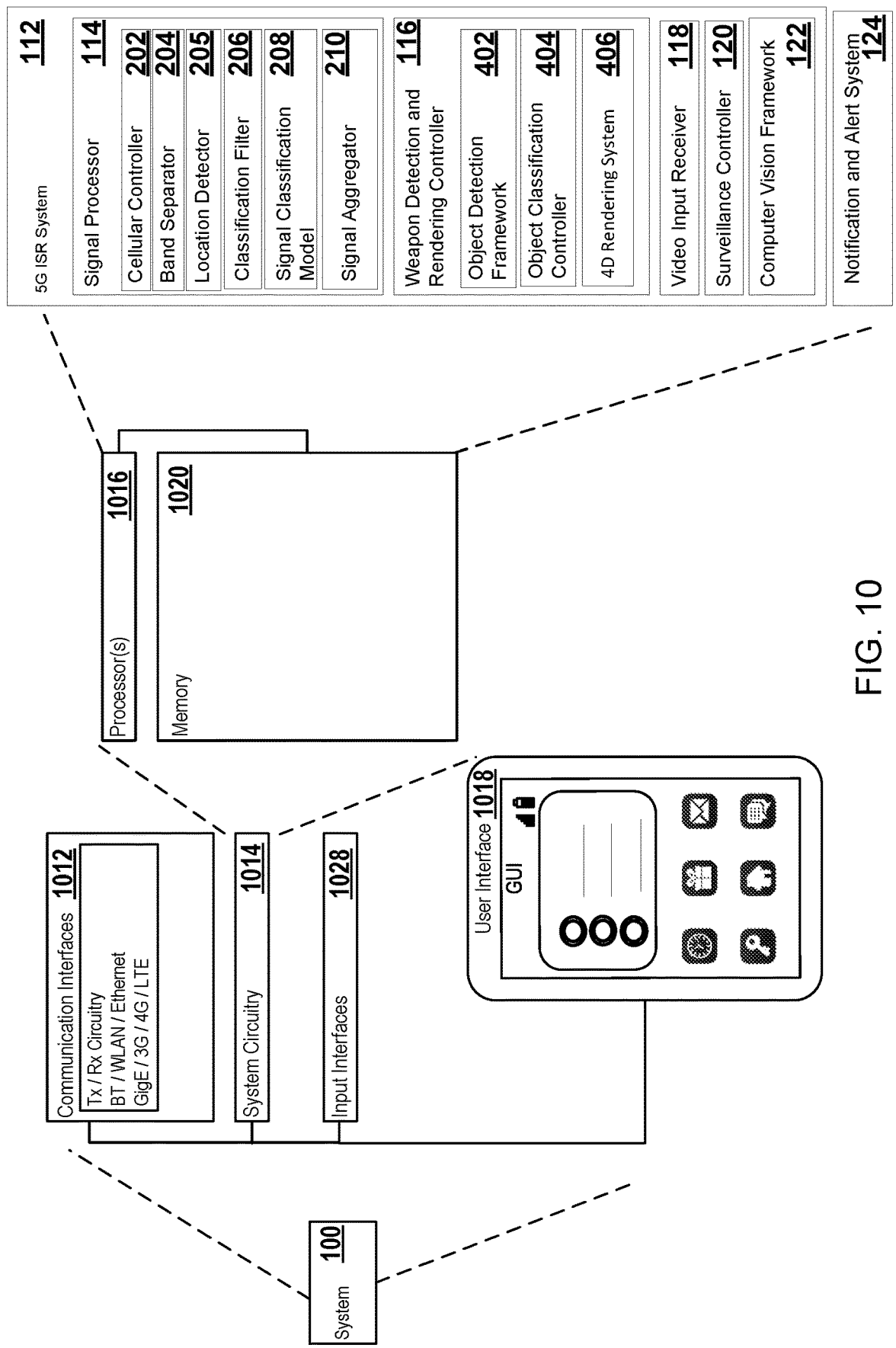
FIG. 10 illustrates a second example of a system.

FIG. 10 illustrates a second example of the system 100. The system 100 may include communication interfaces 1012, input interfaces 1028 and/or system circuitry 1014. The system circuitry 1014 may include a processor 1016 or multiple processors. Alternatively or in addition, the system circuitry 1014 may include memory 1020.

The processor 1016 may be in communication with the memory 1020. In some examples, the processor 1016 may also be in communication with additional elements, such as the communication interfaces 1012, the input interfaces 1028, and/or the user interface 1018. Examples of the processor 1016 may include a general processor, a central processing unit, logical CPUs/arrays, a microcontroller, a server, an application specific integrated circuit (ASIC), a digital signal processor, a field programmable gate array (FPGA), and/or a digital circuit, analog circuit, or some combination thereof.

The processor 1016 may be one or more devices operable to execute logic. The logic may include computer executable instructions or computer code stored in the memory 1020 or in other memory that when executed by the processor 1016, cause the processor 1016 to perform the operations the 5G ISR system, the signal processor 114, the cellular controller 202, the band separator 204, the location detector 205, the classification filter 206, the signal classification model 208, the signal aggregator 210, the WDR controller 116, the object detection framework 402, the object classification controller 404, the 4D rendering system 406, the video input receiver 118, the surveillance controller 120, the notification and alert system 124, and/or the system 100. The computer code may include instructions executable with the processor 1016.

The memory 1020 may be any device for storing and retrieving data or any combination thereof. The memory 1020 may include non-volatile and/or volatile memory, such as a random access memory (RAM), a read-only memory (ROM), an erasable programmable read-only memory (EPROM), or flash memory. Alternatively or in addition, the memory 1020 may include an optical, magnetic (hard-drive), solid-state drive or any other form of data storage device. The memory 1020 may include at least one of the 5G ISR system, the signal processor 114, the cellular controller 202, the band separator 204, the location detector 205, the classification filter 206, the signal classification model 208, the signal aggregator 210, the WDR controller 116, the object detection framework 402, the object classification controller 404, the 4D rendering system 406, the video input receiver 118, the surveillance controller 120, the notification and alert system 124, and/or the system 100. Alternatively or in addition, the memory may include any other component or sub-component of the system 100 described herein.

The user interface 1018 may include any interface for displaying graphical information. The system circuitry 1014 and/or the communications interface(s) 1012 may communicate signals or commands to the user interface 1018 that cause the user interface to display graphical information. Alternatively or in addition, the user interface 1018 may be remote to the system 100 and the system circuitry 1014 and/or communication interface(s) may communicate instructions, such as HTML, to the user interface to cause the user interface to display, compile, and/or render information content. In some examples, the content displayed by the user interface 1018 may be interactive or responsive to user input. For example, the user interface 1018 may communicate signals, messages, and/or information back to the communications interface 1012 or system circuitry 1014.

The system 100 may be implemented in many different ways. In some examples, the system 100 may be implemented with one or more logical components. For example, the logical components of the system 100 may be hardware or a combination of hardware and software. The logical components may include the 5G ISR system, the signal processor 114, the cellular controller 202, the band separator 204, the location detector 205, the classification filter 206, the signal classification model 208, the signal aggregator 210, the WDR controller 116, the object detection framework 402, the object classification controller 404, the 4D rendering system 406, the video input receiver 118, the surveillance controller 120, the notification and alert system 124, the system 100, and/or any component or subcomponent of the system 100. In some examples, each logic component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 1020, for example, that comprises instructions executable with the processor 1016 or other processor to implement one or more of the features of the logical components. When any one of the logical components includes the portion of the memory that comprises instructions executable with the processor 1016, the component may or may not include the processor 1016. In some examples, each logical component may just be the portion of the memory 1020 or other physical memory that comprises instructions executable with the processor 1016, or other processor(s), to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks, flash memory drives, floppy disks, and CD-ROMs. Moreover, the various logical units, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer and/or central processing unit ("CPU").

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A method, comprising:
   receiving video input data generated by one or more camera devices positioned in a target physical environment;
   receiving electromagnetic (EM) response signals generated by an array of 5G antenna devices positioned at multiple vantage points in the target physical environment, wherein each of the EM response signals are generated by a corresponding 5G antenna device, the EM response signals representative of EM energy being reflected or refracted in the target physical environment;
   determining location information for the EM response signals, the location information representative of a location of a metallic object in the target physical environment where EM energy was reflected or refracted;
   generating a movement trajectory of the metallic object based on comparison of the location information with historical location information;
   generating a feature vector comprising an aggregation of the EM response signals and the movement trajectory;
   submitting the feature vector to a machine learning framework configured to access a machine learning model; and
   classifying, in response to submission of the feature vector to the machine learning framework, the metallic object as a weapon.

2. The method of claim 1, further comprising:
   generating, in response to the classification of the metallic object as a weapon, a virtual render comprising a graphical indication of the metallic object;
   combining the virtual render with the video input data; and
   causing display of the combined virtual render and the video input data to show the graphical indication of the metallic object and video corresponding to the video input data.

3. The method of claim 1, wherein the 5G antenna devices include a first antenna device and a second antenna device, further comprising;
   identifying a first EM response signal generated by the first antenna device;
   identifying a second EM response signal generated by the second antenna device; and
   determining the first EM response signal and the second EM response signal correspond to EM energy reflected or refracted at a same location in the target physical environment.

4. The method of claim 1, wherein determining location information for the EM response signals further comprises:
   determining an altitude of the metallic object, coordinates of the metallic object, a speed of the metallic object, a movement direction of the metallic object, or a combination thereof.

5. The method of claim 1, further comprising:
   determine a measurement of a physical characteristic of the metallic object based on the EM response signals; and
   including the measurement of the physical characteristic in the feature vector.

6. The method of claim 5, wherein the physical characteristic comprises a density of the metallic object, a material of the metallic object, a shape of the metallic object, or a combination thereof.

7. The method of claim 1, further comprising:
   receiving an image-based feature derived from the video input data; and
   including the image-based feature in the feature vector.

8. The method of claim 1, wherein generating the feature vector further comprises:
   generating a first feature parameter comprising a first EM response signal generated by a first corresponding one of the 5G antenna devices;
   generating a second feature parameter comprising a second EM response signal generated by a second corresponding one of the 5G antenna devices; and
   combining the first feature parameter with the second feature parameter.

9. The method of claim 1, wherein the machine learning model comprises: a second machine learning model, wherein refining EM response signals:
   determining a confidence measurement based on at least one of the EM response signals being reflected/refracted by the metallic object; and
   filtering the at least one of the EM response signals from the received EM response signals in response to the confidence measurement being lower than a threshold confidence value.

10. The method of claim 1, wherein classifying, in response to submission of the feature vector to the machine learning framework, the metallic object as the weapon further comprises:
    generating a confidence measurement based on a combination of weight values from the machine learning model with the feature vector, the confidence measurement representative of the metallic object being the weapon; and
    determining the confidence measurement is greater than a threshold confidence value.

11. The method of claim 1, further wherein refining the EM response signals further comprises:
    filtering the EM response signals to include only EM response signals with corresponding frequencies between 24 GHz and 40 GHz.

12. The method of claim 1, further comprising:
refining the EM response signals by removing at least one of the EM response signals corresponding to a static object in the physical environment.

13. The method of claim 1, wherein the machine learning model is previously trained based on training data, the training data comprising historical EM response signals and historical movement trajectories for metallic objects.

14. A system, comprising:
an array of 5G antenna devices positioned in a target physical environment;
a surveillance infrastructure comprising a camera device positioned in the target physical environment; and
a processor configured to:
receive video input data generated by the camera device;
receive electromagnetic (EM) response signals generated by the array of 5G antenna devices, wherein each of the EM response signals are generated by a corresponding 5G antenna device, the EM response signals representative of EM response in the target physical environment;
determine location information for the EM response signals, the location information representative of a location of a metallic object in the target physical environment where EM energy was reflected or refracted;
generate a movement trajectory of the metallic object based on comparison of the location information with historical location information;
generate a feature vector comprising an aggregation of the EM response signals and the movement trajectory;
submit the feature vector to a machine learning framework configured to access a machine learning model previously trained based on training data, the training data comprising historical EM response signals and historical movement trajectories for metallic objects;
classify, in response to submission of the feature vector to the machine learning framework, the metallic object as a weapon; and
generate, in response to the classification of the metallic object as a weapon, a virtual render of the metallic object.

15. The system of claim 14, wherein the processor is further configured to:
combine the virtual render with the video input data; and
cause display of the combined virtual render and video data.

16. The system of claim 14, wherein the 5G antenna devices include a first antenna device and a second antenna device, wherein the processor is further configured to:
identify a first EM response signal was generated by the first antenna device;
identify a second EM response signal generated by the second antenna device; and
determine the first EM response signal and the second EM response signal corresponding to EM energy reflected or refracted at a same location in the target physical environment.

17. The system of claim 14, wherein the processor is further configured to:
determine a measurement of a physical characteristic of the metallic object based on the EM response signals, the physical characteristic comprising a density of the metallic object, a material of the metallic object, a shape of the metallic object, or a combination thereof;
determine an image-based feature derived from the video input data; and
include the measurement of the physical characteristic and the image-based feature in the feature vector.

18. The system of claim 14, wherein to generate the feature vector, the processor is further configured to:
generate a first feature parameter comprising a first EM response signal generated by a first corresponding one of the 5G antenna devices;
generate a second feature parameter comprising a second EM response signal generated by a second corresponding one of the 5G antenna devices; and
combine the first feature parameter with the second feature parameter.

19. The system of claim 14, wherein the processor is further configured to refine the EM response signals, wherein to refine the EM response signals, the processor is further configured to:
identify an EM response signal corresponding to a static object in the target physical environment; and
filter the identified EM response signal from the received EM response signals.

20. The system of claim 14, wherein the machine learning model comprises a second machine learning model, wherein the processor is further configured to:
determine a confidence measurement based on at least one of the EM response signals being reflected/refracted by the metallic object; and
refine the EM response signals by removal of the at least one of the EM response signals from the received EM response signals in response to the confidence measurement being lower than a threshold confidence value.

21. A non-transitory computer readable storage medium, comprising:
a plurality of instructions accessible to a processor, the instructions comprising:
instructions executable by the processor to receive video input data generated by a camera device positioned in a target physical environment;
instructions executable by the processor to receive electromagnetic (EM) response signals generated by an array of 5G antenna devices positioned in the target physical environment, wherein each of the EM response signals are generated by a corresponding 5G antenna device, the EM response signals representative of EM energy being reflected or refracted in the target physical environment;
instructions executable by the processor to refine the EM response signals;
instructions executable by the processor to determine location information for the refined EM response signals, the location information representative of a location of a metallic object in the target physical environment where EM energy was reflected or refracted;
instructions executable by the processor to generate a movement trajectory of the metallic object based on comparison of the location information with historical location information;
instructions executable by the processor to generate a feature vector comprising an aggregation of the refined EM response signals and the movement trajectory;
instructions executable by the processor to submit the feature vector to a machine learning framework configured to access a machine learning model previously trained based on training data, the training data comprising historical EM response signals and historical movement trajectories for metallic objects;

instructions executable by the processor to classify, in response to submission of the feature vector to the machine learning framework, the metallic object as a weapon;

instructions executable by the processor to generate, in response to the classification of the metallic object as a weapon, a virtual render comprising a graphical indication of the metallic object;

instructions executable by the processor to combine the virtual render with the video input data; and instructions executable by the processor to cause display of the combined virtual render and video data.

22. The non-transitory computer readable storage medium of claim 21, wherein the instructions executable by the processor to generate the feature vector further comprise:

instructions executable by the processor to generate a first feature parameter comprising a first EM response signal generated by a first corresponding one of the 5G antenna devices;

instructions executable by the processor to generate a second feature parameter comprising a second EM response signal generated by a second corresponding one of the 5G antenna devices; and instructions executable by the processor to combine the first feature parameter with the second feature parameter.

23. The non-transitory computer readable storage medium of claim 21, further comprising:

instructions executable by the processor to determine a measurement of a physical characteristic of the metallic object based on the refined EM response signals, the physical characteristic comprising a density of the metallic object, a material of the metallic object, a shape of the metallic object, or a combination thereof;

instructions executable by the processor to determine an image-based feature derived from the video input data; and instructions executable by the processor to include the measurement of the physical characteristic and the image-based feature in the feature vector.

* * * * *